United States Patent
Ramanjani et al.

(10) Patent No.: US 12,314,960 B2
(45) Date of Patent: May 27, 2025

(54) SYSTEMS AND METHODS FOR PREDICTIVE ANALYSIS OF ELECTRONIC TRANSACTION REPRESENTMENT DATA USING MACHINE LEARNING

(71) Applicant: WORLDPAY, LLC, Symmes Township, OH (US)

(72) Inventors: Rajiv Ramanjani, Bengaluru (IN); Yogendra Katheria, Kanpur (IN); Harsh Sharma, New Delhi (IN); Rahul Pramod Nandanwar, Pune (IN); Bhanu Sirisha Pothukuchi, Pune (IN); Rohit V. Raut, Pune (IN); Milin Kapoor, Pune (IN)

(73) Assignee: Worldpay, LLC, Symmes Township, OH (US)

( * ) Notice: Subject to any disclaimer, the term of this patent is extended or adjusted under 35 U.S.C. 154(b) by 198 days.

(21) Appl. No.: 17/834,677

(22) Filed: Jun. 7, 2022

(65) Prior Publication Data

US 2023/0281635 A1 Sep. 7, 2023

(51) Int. Cl.
*G06Q 20/42* (2012.01)
*G06N 20/20* (2019.01)

(52) U.S. Cl.
CPC ............. *G06Q 20/42* (2013.01); *G06N 20/20* (2019.01)

(58) Field of Classification Search
CPC .............................. G06Q 20/42; G06N 20/20
USPC ....................................................... 705/39
See application file for complete search history.

(56) References Cited

U.S. PATENT DOCUMENTS

| | | | |
|---|---|---|---|
| 10,504,122 B2* | 12/2019 | Senci | G06Q 40/02 |
| 10,825,012 B1* | 11/2020 | Senci | G06N 20/00 |
| 2017/0178134 A1* | 6/2017 | Senci | G06Q 20/4016 |
| 2019/0164159 A1 | 5/2019 | Ponniah et al. | |
| 2021/0065191 A1 | 3/2021 | Shetler et al. | |
| 2021/0158355 A1 | 5/2021 | Kramme et al. | |
| 2021/0224826 A1 | 7/2021 | Veeraraghavan et al. | |
| 2021/0390550 A1* | 12/2021 | Liao | G06N 20/00 |

OTHER PUBLICATIONS

International Search Report issued in International Application No. PCT/US2023/063421 dated Apr. 25, 2023 (10 pages).

(Continued)

*Primary Examiner* — Lindsay M Maguire
(74) *Attorney, Agent, or Firm* — Bookoff McAndrews, PLLC

(57) ABSTRACT

Systems and methods are disclosed for generating a prediction on chargeback representment based on probability data and/or results from a plurality of machine learning models. The method includes receiving data associated with at least one disputed transaction for at least one user, wherein the received data includes user-specific information and/or merchant-specific information. The received data is processed to calculate a probability of success in a chargeback representment for the at least one disputed transaction. A prediction is calculated based, at least in part, on the probability of success, one or more results from a plurality of machine learning models, or a combination thereof. A presentation is generated of at least one recommendation on the chargeback representment based, at least in part, on the prediction in a user interface of at least one device associated with the at least one user.

20 Claims, 14 Drawing Sheets

(56) References Cited

OTHER PUBLICATIONS

Randhawa Kuldeep et al: "Credit Card Fraud Detection Using AdaBoost and Majority Voting", vol. 6, Jan. 1, 2018 (Jan. 1, 2018), pp. 14277-14284, XP093039389, DOI: 10.1109/ACCESS.2018.2806420.

* cited by examiner

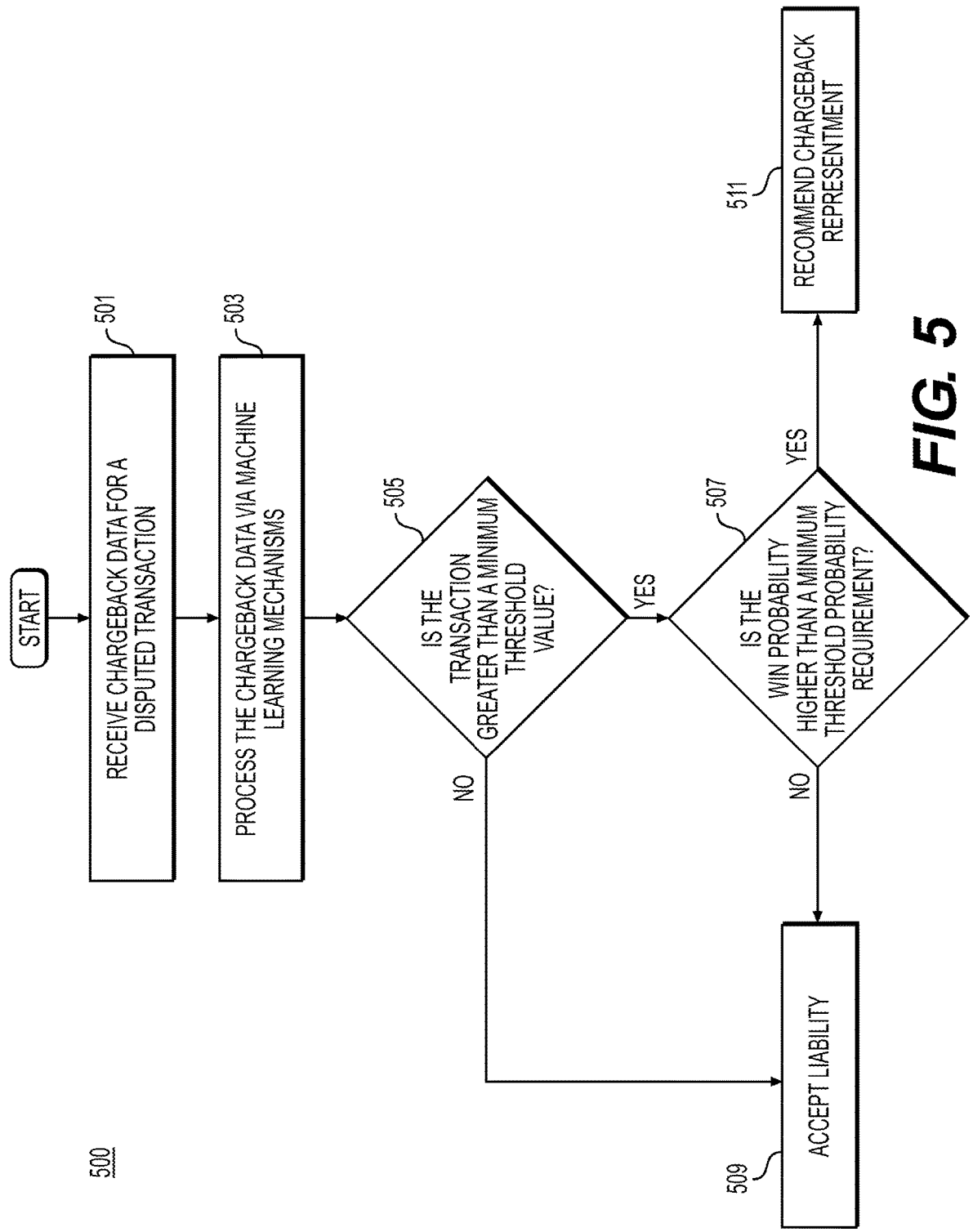

| TRANSACTION | PREDICTION | WIN PROBABILITY | LOSS PROBABILITY | RECOMMENDATION |
|---|---|---|---|---|
| 234-XX-XXX | LOSS | 63% | 37% | ACCEPT LIABILITY |
| 345-XX-XXX | LOSS | 65% | 35% | ACCEPT LIABILITY |
| 456-XX-XXX | WIN | 72% | 28% | MAKE REPRESENTMENT |
| 567-XX-XXX | WIN | 75% | 25% | MAKE REPRESENTMENT |
| 678-XX-XXX | WIN | 82% | 18% | MAKE REPRESENTMENT |
| 789-XX-XXX | LOSS | 53% | 47% | ACCEPT LIABILITY |
| 890-XX-XXX | WIN | 92% | 8% | MAKE REPRESENTMENT |
| 901-XX-XXX | LOSS | 69% | 31% | ACCEPT LIABILITY |
| 213-XX-XXX | LOSS | 71% | 29% | ACCEPT LIABILITY |

*FIG. 7 CONT.*

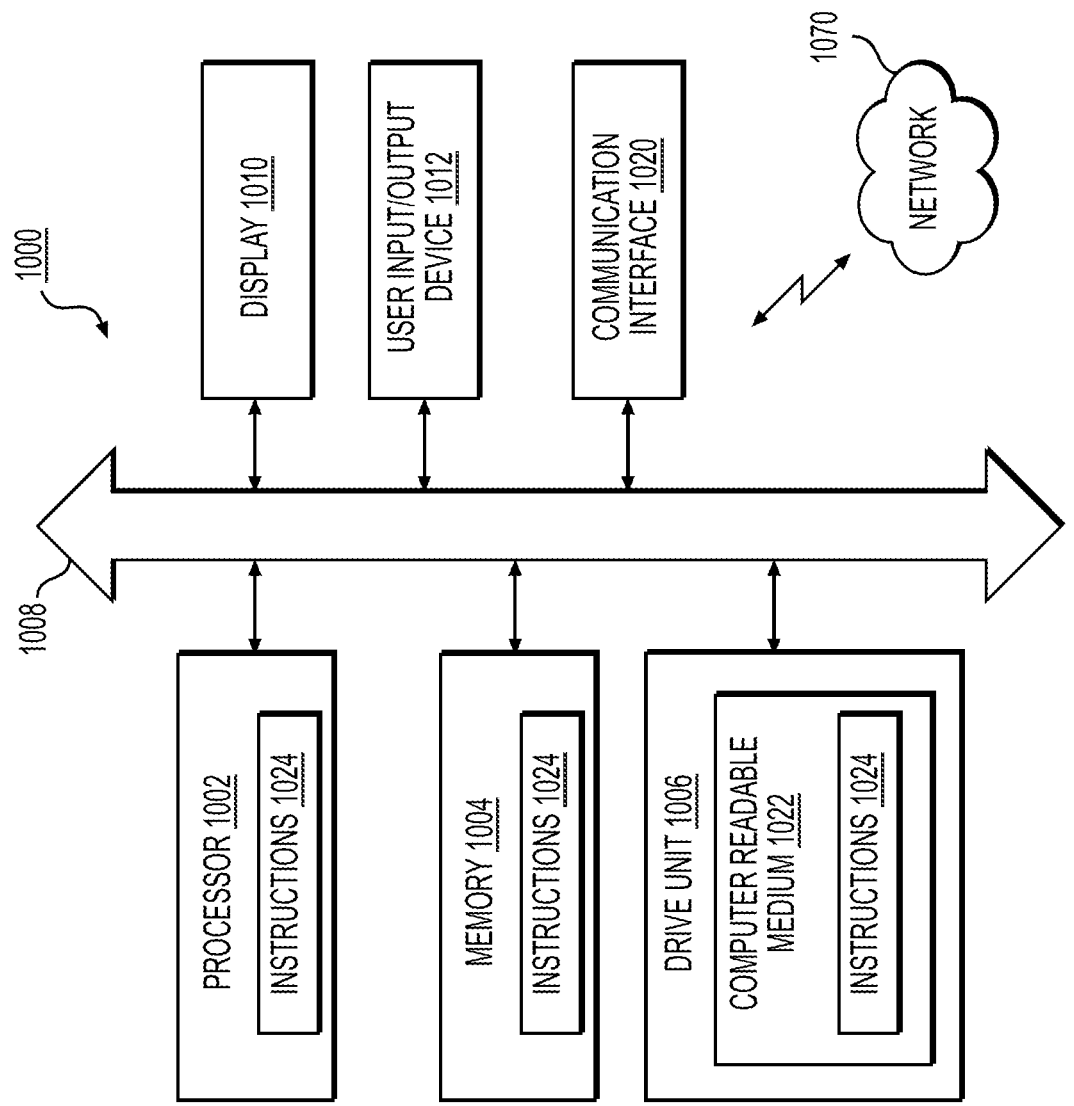

SYSTEMS AND METHODS FOR PREDICTIVE ANALYSIS OF ELECTRONIC TRANSACTION REPRESENTMENT DATA USING MACHINE LEARNING

CROSS REFERENCE TO RELATED APPLICATIONS

This application claims priority from Indian patent application No. 202211011590, filed on Mar. 3, 2022, the contents of which are hereby incorporated herein in their entirety by this reference.

TECHNICAL FIELD

The present disclosure relates generally to the use of machine learning for analyzing datasets for predicting, reducing, and/or preventing electronic transaction fraud.

BACKGROUND

A chargeback is a return of funds to an account holder forcibly initiated by an issuing bank of the instrument used by the account holder to settle a debt. Since merchants cannot identify which chargeback to represent and which to forfeit, in general, chargebacks are financially detrimental to the merchants and negatively impacts their reputation, e.g., loss of trust. A chargeback may include illegitimate chargebacks, also known as friendly fraud where the transaction was authorized by the user but the user later attempts to fraudulently reverse the charges. For example, a cardholder may unmaliciously dispute a proper charge on the payment system, and the merchant or the issuer bank may absorb the loss even though there were no problems with the disputed transaction. On the other hand, malicious users can exploit such vulnerabilities in a conventional chargeback system by committing actual fraud by intentionally disputing a proper charge. Friendly fraud may capitalize on the lack of information and proof that the actual owners of the payment instruments executed the transactions.

Online fraud is occurring with increasing frequency and severity, and online ("e-commerce") providers and users must have appropriate fraud prevention mechanisms in place to reduce or even prevent them. Service providers and device manufacturers are constantly challenged to provide a service that detects potentially fraudulent transactions. The current solutions of flagging a transaction as fraudulent based on the transaction amount and transaction location have a low threshold for triggering a fraud alert, which sometimes results in false positives. The prevalence of false positives results in a lack of confidence amongst the users regarding the transactions detected as fraudulent, e.g., friendly fraud. False positives lead to a drain on human resources, e.g., calling customers to discuss each suspected transaction, and/or other manual investigation techniques.

Chargeback is on the rise because it is difficult and costly for merchants to dispute the chargebacks or to prove the legitimacy of the disputed transaction. Furthermore, the prevalence of false positives in potentially fraudulent transactions, e.g., friendly fraud, discourages merchants from disputing the chargebacks. To provide a solution to these shortcomings, a machine learning model and related systems and methods are needed to enable data analytics for reducing false positives and recommending chargeback representment.

SUMMARY OF THE DISCLOSURE

According to certain aspects of the disclosure, systems and methods are disclosed for generating a prediction of electronic transaction reversal (e.g., "chargeback representment") based on probability data and/or results from a plurality of machine learning models.

In one embodiment, a method is disclosed for reducing false positives and recommending chargeback representment. The method includes: receiving data associated with at least one disputed transaction for at least one user, wherein the received data includes user-specific information, merchant-specific information, or a combination thereof; processing the received data to calculate a probability of success in a chargeback representment for the at least one disputed transaction; calculating a prediction based, at least in part, on the probability of success, one or more results from a plurality of machine learning models, or a combination thereof; and generating a presentation of at least one recommendation on the chargeback representment based, at least in part, on the prediction in a user interface of at least one device associated with the at least one user.

In one embodiment, an apparatus comprises at least one processor, and at least one memory including computer program code for one or more computer programs, the at least one memory and the computer program code configured to, with the at least one processor, cause, at least in part, the apparatus to reduce false positives and recommending chargeback representment. The apparatus causes: receive data associated with at least one disputed transaction for at least one user, wherein the received data includes user-specific information, merchant-specific information, or a combination thereof; process the received data to calculate a probability of success in a chargeback representment for the at least one disputed transaction; calculate a prediction based, at least in part, on the probability of success, one or more results from a plurality of machine learning models, or a combination thereof; and generate a presentation of at least one recommendation on the chargeback representment based, at least in part, on the prediction in a user interface of at least one device associated with the at least one user.

In accordance with another embodiment, a non-transitory computer-readable storage medium having stored thereon one or more program instructions which, when executed by one or more processors, cause, at least in part, an apparatus to reduce false positives and recommending chargeback representment. The apparatus causes: receiving data associated with at least one disputed transaction for at least one user, wherein the received data includes user-specific information, merchant-specific information, or a combination thereof; processing the received data to calculate a probability of success in a chargeback representment for the at least one disputed transaction; calculating a prediction based, at least in part, on the probability of success, one or more results from a plurality of machine learning models, or a combination thereof; and generating a presentation of at least one recommendation on the chargeback representment based, at least in part, on the prediction in a user interface of at least one device associated with the at least one user.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 5 is a flowchart of a process for automatically determining chargeback representments for disputed transactions, according to one example embodiment;

FIG. 10 illustrates an implementation of a general computer system that may execute techniques presented herein.

DETAILED DESCRIPTION OF EMBODIMENTS

Figure 1:
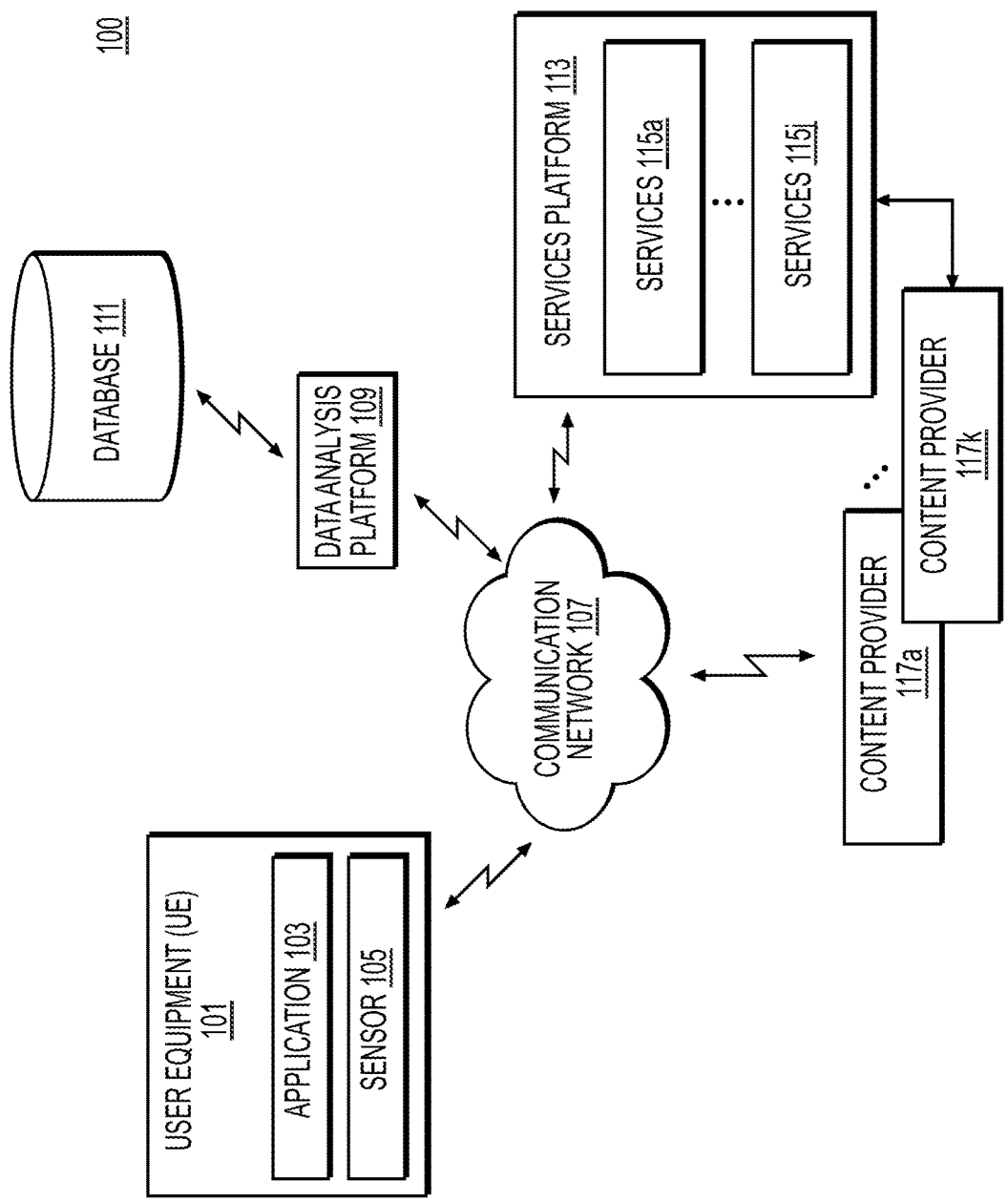
FIG. 1 is a diagram of a system for generating a prediction on chargeback representment based on probability data and/or results from a plurality of machine learning models, according to one example embodiment.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of the apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Electronic payment card processing systems are in widespread use to process transactions between a cardholder, a merchant, an acquirer bank, and an issuing bank. For example, a cardholder may use a payment vehicle, e.g., a credit card, to initiate a transaction to purchase goods from a merchant. Then, an acquiring bank, i.e., the merchant's bank, may reimburse the merchant for the transaction. Thereafter, the acquiring bank may settle those funds with an issuing bank of the account corresponding to the payment card.

The cardholder may initiate a transaction dispute, e.g., chargeback, with the issuing bank to return some or all of the funds associated with the disputed transaction to the account corresponding to the payment card. Chargebacks can also occur as a result of friendly fraud, where the transaction was authorized by the cardholder but the cardholder later attempts to fraudulently (i.e., either mistakenly or maliciously) reverse the charges. Such types of chargebacks can be financially detrimental to the merchant and may affect the ability of the merchants to accept certain payment vehicles in the future.

In response to receiving a chargeback, the merchant is provided an opportunity to dispute the chargeback, if desired, with the issuing bank. While merchants may be tempted to dispute every chargeback to avoid lost revenue, it is important to balance the value of the transaction, the reason for the chargeback, and compelling evidence before disputing the chargeback. The merchants also need to consider whether they might lose a valued customer when they dispute a chargeback. In addition, disputing a chargeback is time-consuming and costly, e.g., merchants may spend hours finding compelling evidence to dispute the chargeback. Furthermore, the existing solutions are not accurate and the prevalence of false-positive in current fraud detection mechanisms discourages the merchants from disputing a chargeback. Other conventional processes relating to detecting financial fraud are resource-intensive, e.g., manual reviews of fraudulent transactions are a significant drain on human resources and may result in errors.

System 100 may use new processing techniques to determine a prediction on chargeback representment and may provide solutions for the identified shortcomings. The determination of such predictions may be based upon various types of information, and the rules used to determine such predictions may be generated by machine learning models. For example, historical data of one or more users are fed to teach the machine learning models on the types of fraud signals to monitor. The trained models may evaluate the disputed transactions based on the risk factor and may make real-time predictions on disputed transactions.

FIG. 1 is a diagram of a system for generating a prediction of chargeback representment based on probability data and/or results from a plurality of machine learning models, according to one example embodiment. FIG. 1 introduces a capability to implement modern communication and data processing capabilities into existing methods and systems for generating a prediction on chargeback representment to facilitate a service provider, e.g., a merchant. FIG. 1, an example architecture of one or more example embodiments of the present invention, includes system 100 that comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, data analysis platform 109 has connectivity to UE 101, database 111, services platform 113, and content provider 117a-117k (collectively referred to as content provider 117) via communication network 107, e.g., a wireless communication network.

As shown in FIG. 1, system 100 comprises UE 101. In one embodiment, UE 101 may include but is not restricted to, any type of a mobile terminal, wireless terminal, fixed terminal, or portable terminal. Examples of UE 101, may include, but are not restricted to, a mobile handset, a wireless communication device, a station, a unit, a device, a multimedia computer, a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), a digital camera/camcorder, an infotainment system, a dashboard computer, a television device, or any combination thereof, including the accessories and peripherals of these devices, or any combination thereof. In addition, UE 101 may facilitate various input means for receiving and generating information, including, but not restricted to, a touch screen capability, a keyboard, and keypad data entry, a voice-based input mechanism, and the like. Any known and future implementations of UE 101 may also be applicable.

UE 101 includes applications 103. Further, applications 103 may include various applications such as, but not restricted to, content provisioning application, networking application, camera/imaging application, multimedia application, social networking applications, location-based application, media player applications, and the like. In one embodiment, one of the applications 103 at UE 101 may act as a client for data analysis platform 109 and perform one or more functions associated with the functions of data analysis platform 109 by interacting with data analysis platform 109 over the communication network 107.

By way of example, sensor 105 may be any type of sensor. In one embodiment, the sensors 105 may include, for example, a network detection sensor for detecting wireless signals or receivers for different short-range communications (e.g., Bluetooth, Wi-Fi, Li-Fi, near field communication (NFC), etc.), temporal information sensors, a global positioning sensor for gathering location data, a camera/imaging sensor for gathering image data, an audio recorder for gathering audio data, and the like. Any known and future implementations of sensor 105 may also be applicable.

Further, various elements of the system 100 may communicate with each other through a communication network 107. The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including 5G (5th Generation), 4G, 3G, 2G, Long Term Evolution (LTE), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, data analysis platform 109 may be a platform with multiple interconnected components. Data analysis platform 109 may include one or more servers, intelligent networking devices, computing devices, components, and corresponding software for generating a prediction on chargeback representment based on probability data and/or results from a plurality of machine learning models. In addition, it is noted that data analysis platform 109 may be a separate entity of the system 100, a part of services 115a-115j (collectively referred to as services 115) of the services platform 113, or the UE 101. Any known or still developing methods, techniques, or processes for generating a prediction on chargeback representment based on probability data and/or results from a plurality of machine learning models may be employed by data analysis platform 109.

In one embodiment, data analysis platform 109 may receive data associated with at least one disputed transaction for at least one user, wherein the data includes chargeback data. Data analysis platform 109 may process the data to calculate a probability of success in a chargeback representment for the at least one disputed transaction. Data analysis platform 109 may then calculate a prediction based, at least in part, on the probability of success, one or more results from a plurality of machine learning models, or a combination thereof. Data analysis platform 109 may generate a presentation of at least one recommendation on the chargeback representment based, at least in part, on the prediction in a user interface of at least one device associated with the at least one user.

In one embodiment, database 111 may be any type of database, such as relational, hierarchical, object-oriented, and/or the like, wherein data are organized in any suitable manner, including as data tables or lookup tables. In one embodiment, database 111 may store and manage multiple types of information that can provide means for aiding in the content provisioning and sharing process. In an embodiment, database 111 may include a machine-learning based training database with pre-defined mapping defining a relationship between various input parameters and output parameters based on various statistical methods. In an embodiment, the training database may include machine-learning algorithms to learn mappings between input parameters related to the user such as but not limited to the user's online activity, historical user information, historical transaction information, historical chargeback information, etc. In an embodiment, the training database is routinely updated and/or supplemented based on machine learning methods.

The services platform 113 may include any type of service. By way of example, services platform 113 may include content (e.g., textual, audio, video, images, etc.) provisioning services/application, notification services/application, contextual information determination services/application, notification services/application, storage services/application, social networking services/application, information-based services, etc. In one embodiment, services platform 113 may interact with UE 101, data analysis platform 109, and content provider 117 to supplement or aid in the processing of the content information. In one embodiment, the services platform 113 may be implemented or embedded in data analysis platform 109 or its functions.

By way of example, services 115 may be an online service that reflects the interests and/or activities of users. Services 115 allow users to share contextual information, historical user information, activities information, online transaction information, location information, and interests within their individual networks and provide for data portability. Services 115 may additionally assist in providing data analysis platform 109 with activity information, historical user information, profile information, and a variety of additional information associated with the users.

The content providers 117 may provide content to UE 101, data analysis platform 109, and services 115 of the services platform 113. The content provided may be any type of content, such as textual content, image content, audio content, video content, etc. In one embodiment, content provider 117 may provide content that may supplement the content of applications 103, sensors 105, or a combination thereof. In one embodiment, the content provider 117 may provide or supplement the content (e.g., audio, video, images, etc.) provisioning services/application, application services/application, storage services/application, contextual information determination services/application, notification services/application, social networking services/application, location-based services/application, or any combination thereof. In one embodiment, the content provider 117 may also store content associated with UE 101, data analysis platform 109, and services 115 of services platform 113. In another embodiment, the content provider 117 may manage access to a central repository of data and offer a consistent, standard interface to data.

By way of example, UE 101, data analysis platform 109, services platform 113, and content provider 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
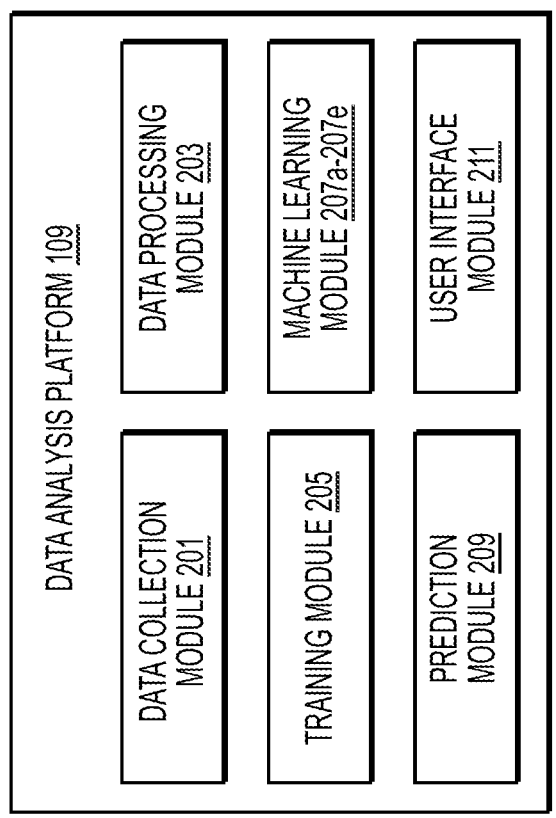
FIG. 2 is a diagram of the components of data analysis platform 109, according to one example embodiment.

FIG. 2 is a diagram of the components of data analysis platform 109, according to one example embodiment. By way of example, data analysis platform 109 includes one or more components for generating a prediction on chargeback representment based on probability data and/or results from a plurality of machine learning models. It is contemplated that the functions of these components may be combined in one or more components or performed by other components of equivalent functionality. In one embodiment, data analysis platform 109 comprises data collection module 201, data processing module 203, training module 205, machine learning module 207, prediction module 209, and user interface module 211, or any combination thereof.

In one embodiment, data collection module 201 may automatically collect relevant data of users, e.g., customers, merchants, etc., associated with the disputed transaction through various data collection techniques. For example, data collection module 201 may use a web-crawling component to access various databases or other information sources to determine the online activities information of the users. Data collection module 201 may be programmed to collect, in real-time, historical information, contextual information, or a combination thereof pertaining to the users, so that identification, analysis, response, monitoring, and control may be performed using the most recent data. In one example embodiment, data collection module 201 may include various software applications, e.g., data mining applications in Extended Meta Language (XML), that automatically search for and return relevant information pertaining to the users. In one embodiment, data collection module 201 may parse and arrange the data into a common format that can be easily processed by other modules and platforms. In one embodiment, data collection module 201 may collect, in real-time, various evidence to support the chargeback dispute from various information sources and/or database 111. The collected evidence may include any type of documentary evidence, e.g., proof of delivery, proof of shipment, or other compelling evidence associated with the cardholder, merchant, or the disputed payment vehicle transaction.

In one embodiment, data processing module 203 may process data collected by data collection module 201 to determine context information, device information, payment vehicles information, or a combination thereof associated with the users. By way of example, the context information may include historical information, behavioral data, past transaction information, online activity information, or a combination thereof. By way of example, the device information may include an international mobile equipment identity (IMEI), an electronic serial number, a mobile equipment identity (MEID), or other identifiers unique to the device associated with the user. By way of example, the payment vehicles information may include credit card number, cardholder's name, expiration date, signature information, card verification code, etc. In one example embodiment, data processing module 203 may process the context information of a particular user to determine that the user has a history of fraudulently claiming non-receipt of goods or services to get a refund. In another example embodiment, data processing module 203 may analyze device information and payment vehicle information to determine that the user has on multiple occasions filed chargeback claims stating (i) the order never arrived, (ii) the service was never rendered, (iii) the transaction was not recognized, (iv) the transaction was unauthorized, and/or (v) the goods were damaged.

In one embodiment, training module 205 may train machine learning module 207 using various inputs to enable machine learning module 207 to automatically find relevant information associated with the users from unstructured data. In another embodiment, training module 205 may train machine learning module 207 using various inputs to identify key data, e.g., descriptive data, supplemental data, etc., from relevant information associated with the users. In a further embodiment, training module 205 may train machine learning module 207 using various inputs to enable machine learning module 207 to combine unstructured data with structured data to improve the accuracy of artificial intelligence models and validate data. In one embodiment, training module 205 may train machine learning module 207 using historical transaction data associated with a plurality of financial transactions, and chargeback determinations made in accordance with chargeback rules to each of the plurality of financial transactions. In another embodiment, training module 205 may train machine learning module 207 using historical fraud determinations made in connection to each of the plurality of financial transactions. In one instance, the training module 205 may continuously provide and/or update machine learning module 207 during training using, for instance, supervised deep convolution network or equivalents.

In one embodiment, machine learning module 207 is data-driven and takes into account different combinations of the data. As can be appreciated by one skilled in the art, machine learning techniques can be used to predict and improve the potency of the user's data. Machine learning can ingest the user's data, draw parallels and conclusions across disparate data sets to provide refined data. The refined data can then be abstracted further by performing operations such as categorizing, coding, transforming, interpreting, summarizing, and calculating. Further, the abstracted data can be used in the future for decision-making. In one embodiment, machine learning module 207 may be provided with chargeback data and contextual information by training module 205 during the training phase. Machine learning module 207 may analyze the provided data to calculate win/loss probability for a chargeback representment. In another embodiment, machine learning module 207 may query database 111 to access historical information associated with the user, and may process the historical user information to calculate a win/loss probability for a chargeback representment.

In one embodiment, machine learning module 207 may analyze various types of data to generate and/or update rules to detect and/or classify a single type or category of fraudulent activities in one or more disputed transactions. Machine learning module 207 may implement any suitable type of machine learning, e.g., supervised learning techniques, such as decision trees, regression-based models, support vector machines (SVMs) and/or neural networks; and/or unsupervised learning techniques such as Dirichlet process mixture models and/or k-means clustering. Other machine learning techniques may also be implemented, e.g., techniques utilizing Bayesian networks, deep learning techniques, and so on.

Machine learning module 207 may analyze user-related information to identify patterns of behavior, which may then be used to detect and/or classify fraudulent activities. For example, machine learning module 207 may analyze information obtained from database 111 to identify spending patterns, spending capabilities, chargeback history, payment defaults, etc., associated with different cardholders to determine their behavioral patterns. Machine learning module 207 may incorporate behavioral patterns in determining fraudulent transactions. In one example embodiment, machine learning module 207 may determine a cardholder previously filed an illegitimate chargeback that was not disputed by the merchant. Machine learning module 207 may foresee the cardholder filing similar claims in the future.

In one embodiment, prediction module 209 may generate a single prediction or a batch prediction on chargeback representments based, at least in part, on probability data received from probability module 305. In one example embodiment, prediction module 209 may receive a calculated probability, e.g., a win probability of 51%, and a loss probability of 49% for a chargeback representment. In one embodiment, data analytics platform 109 may combine the calculated win probability scores based on machine learning predictions with represent/don't represent business rules to generate recommendations on chargeback representment. For example, data analytics platform 109 may compare the calculated win probability of 51% to a minimum threshold probability requirement, e.g., 72%. Data analytics platform 109 may not recommend chargeback representment because the calculated probability of 51% is below the minimum threshold requirement. Data analytics platform 109 may recommend chargeback representment if the win probability is equal to or higher than 72%. Prediction module 209 may then implement a second business rule wherein the total value of the disputed transaction is compared to a minimum threshold value, e.g., $20. The prediction module 209 may recommend chargeback representment if the total value of the disputed transaction is higher than the minimum threshold value. In another embodiment, prediction module 209 may generate a single prediction or a batch prediction on chargeback representments based, at least in part, on recommendation data received from a plurality of machine learning modules 207. In one example embodiment, the majority decision of the plurality of machine learning modules is used to make a prediction. If the majority of machine learning modules predict a loss, then prediction module 209 may predict a loss for chargeback representments based on the majority predictions. In another embodiment, prediction module 209 may analyze a large dataset of chargeback data to construct a model configured to predict the success of chargeback representments.

In one embodiment, user interface module 211 may enable a presentation of a graphical user interface (GUI) in a UE 101 associated with the users. User interface module 211 may employ various application programming interfaces (APIs) or other function calls corresponding to the applications on UE 101, thus enabling the display of graphics primitives such as icons, menus, buttons, data entry fields, etc., for generating the user interface elements. In another embodiment, user interface module 211 may cause interfacing of the guidance information with the users to include, at least in part, one or more annotations, scripts, text messages, audio messages, video messages, or a combination thereof. Still further, user interface module 211 may be configured to operate in connection with augmented reality (AR) processing techniques, wherein various applications, graphic elements, and features may interact. In one example embodiment, user interface module 211 may comprise a variety of interfaces, for example, interfaces for data input and output devices, referred to as I/O devices, storage devices, and the like. In another example embodiment, user interface module 211 may implement a conversational user experience "UX" that presents one or more automated interfaces to the user and learns about the users based on information supplied by the user to the automated interface. In one embodiment, user interface module 211 may organize, automate, and synchronize user information to provide improved assistance and a personalized user experience.

The above presented modules and components of data analysis platform 109 may be implemented in hardware, firmware, software, or a combination thereof. Though depicted as a separate entity in FIG. 1, it is contemplated that data analysis platform 109 may be implemented for direct operation by respective UE 101. As such, data analysis platform 109 may generate direct signal inputs by way of the operating system of the UE 101. In another embodiment, one or more of the modules 201-211 may be implemented for operation by respective UEs, as data analysis platform 109. The various executions presented herein contemplate any and all arrangements and models.

Figure 3:
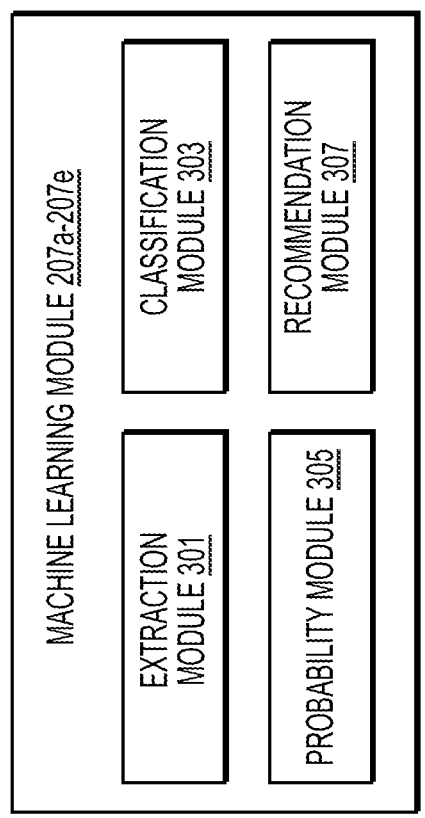
FIG. 3 is a diagram of the components of machine learning module 207, according to one example embodiment.

FIG. 3 is a diagram of the components of machine learning module 207, according to one example embodiment. By way of example, machine learning module 207 includes one or more components for generating a win/loss probability and/or a prediction for chargeback representment. It is contemplated that the functions of these components may be combined in one or more components or performed by other components of equivalent functionality. In one embodiment, machine learning module 207 comprises extraction module 301, classification module 303, probability module 305, and recommendation module 307, or any combination thereof.

In one embodiment, extraction module 301 may extract relevant data associated with the users from the unstructured data collected by data collection module 201. For example, extraction module 301 extracts relevant data and then uses the extracted data to add context around chargeback representment. In another embodiment, extraction module 301 may be configured to separate contents that are to be analyzed from content that provides little or no insight on the disputed transaction, e.g., chargebacks. For example, extraction module 301 may comprise a specialized document object model (DOM) based website extraction module capable of processing dynamic content to accomplish filtering of less relevant content.

In one embodiment, classification module 303 may be configured to collect, collate, sort, and/or organize the data it receives from extraction module 301. Classification module 303 may organize the received data according to one of a plurality of classification criteria using a deep neural network (DNN). In another embodiment, classification module 303 may classify the extracted data based on pattern matching. For example, classification module 303 may store patterns indicative of data types. In classifying the extracted data, classification module 303 identifies matches between the stored patterns and the contents of the extracted data, e.g., chargeback reason code, transaction types, account holder information, etc. Based on the identified matches, classification module 303 classifies data. In another embodiment, classification module 303 may employ a suitable classification processor to identify data types in the contents of the extracted data. In one aspect, the classification processor may be initially trained to identify data types using a set of sample file contents associated with classification module 303.

In one embodiment, probability module 305 may implement machine-learned rules to calculate the likelihood a user may win a chargeback representment. The calculation may include determining a win probability based, at least in part, on an analysis of data of the actual transaction and historical big data, e.g., data of past transactions. In one embodiment, historical data may include customer-specific information indicative of how often a specific customer successfully or unsuccessfully disputed online transactions. In another embodiment, historical data may include merchant-specific information indicative of how often a specific merchant successfully disputed particular types of chargebacks. In a further embodiment, historical data may include global historical win rates (or percentages) indicative of how often, based on the particular chargeback reason code, a group of merchants, e.g., a global population of merchants, successfully disputed particular types of chargebacks.

In one embodiment, probability module 305 may include a rules engine that contains a plurality of business rules for establishing the predetermined threshold values. In one example embodiment, probability module 305 may calculate a win probability of 73% and a loss probability of 27% for a chargeback representment. The calculated probability may then be compared to a predetermined threshold probability requirement, e.g., 72%, to determine whether the user has a higher probability to win the chargeback representment.

In one embodiment, probability module 305 may calculate a probability of re-occurrence of an event based, at least in part, on historical data, behavior data, or a combination thereof associated with at least one user of the disputed transaction. The probability of re-occurrence is the probability that a future event, e.g., a chargeback, a friendly fraud, or any transaction fraud, is likely to reoccur based, at least in part, on historical data, behavior data, or a combination thereof associated with at least one user of the disputed transaction. In calculating the probability of re-occurrence, probability module 305 may generate a matrix that represents a pattern of re-occurrence based, at least in part, on historical data, behavior data, or a combination thereof. In one example embodiment, probability module 305 may determine that dishonest customers repeat their fraudulent behavior within a particular time period, e.g., 20 days, based on historical data. Probability module 305 may assign a score or a weighting value to historical transaction data, device information, account information, or a combination thereof associated with the dishonest customer. In another example embodiment, probability module 305 may determine a higher occurrence of fraudulent transactions during a specific time period, e.g., day, month, or time, based on historical data. Probability module 305 may assign a score or a weighting value to temporal information, historical transaction data, device information, account information, or a combination thereof associated with the disputed transaction. Probability module 305 may then implement the assigned scores and weighting value to generate a probability result.

In one embodiment, recommendation module 307 may generate a recommended action in response to the disputed transaction, e.g., chargeback based on the data received from machine learning module 207 and prediction module 209. In another embodiment, recommendation module 307 may collaborate with user interface module 211 to generate a representment notification to inform the users of the decision to dispute the chargeback or accept financial liability. In one example embodiment, recommendation module 307 may determine that merchants have a higher probability of winning chargeback representments if the dispute is filed within a pre-defined time period, e.g., 14 days, based on historical data. Recommendation module 307 may recommend a merchant to dispute the chargeback within the pre-defined time period.

The above presented modules and components of machine learning module 207 may be implemented in hardware, firmware, software, or a combination thereof. It is contemplated that machine learning module 207 may be implemented for direct operation by respective UE 101. As such, machine learning module 207 may generate direct signal inputs by way of the operating system of the UE 101. In another embodiment, one or more of the modules 301-307 may be implemented for operation by respective UEs, as machine learning module 207. The various executions presented herein contemplate any and all arrangements and models.

Figure 4A:
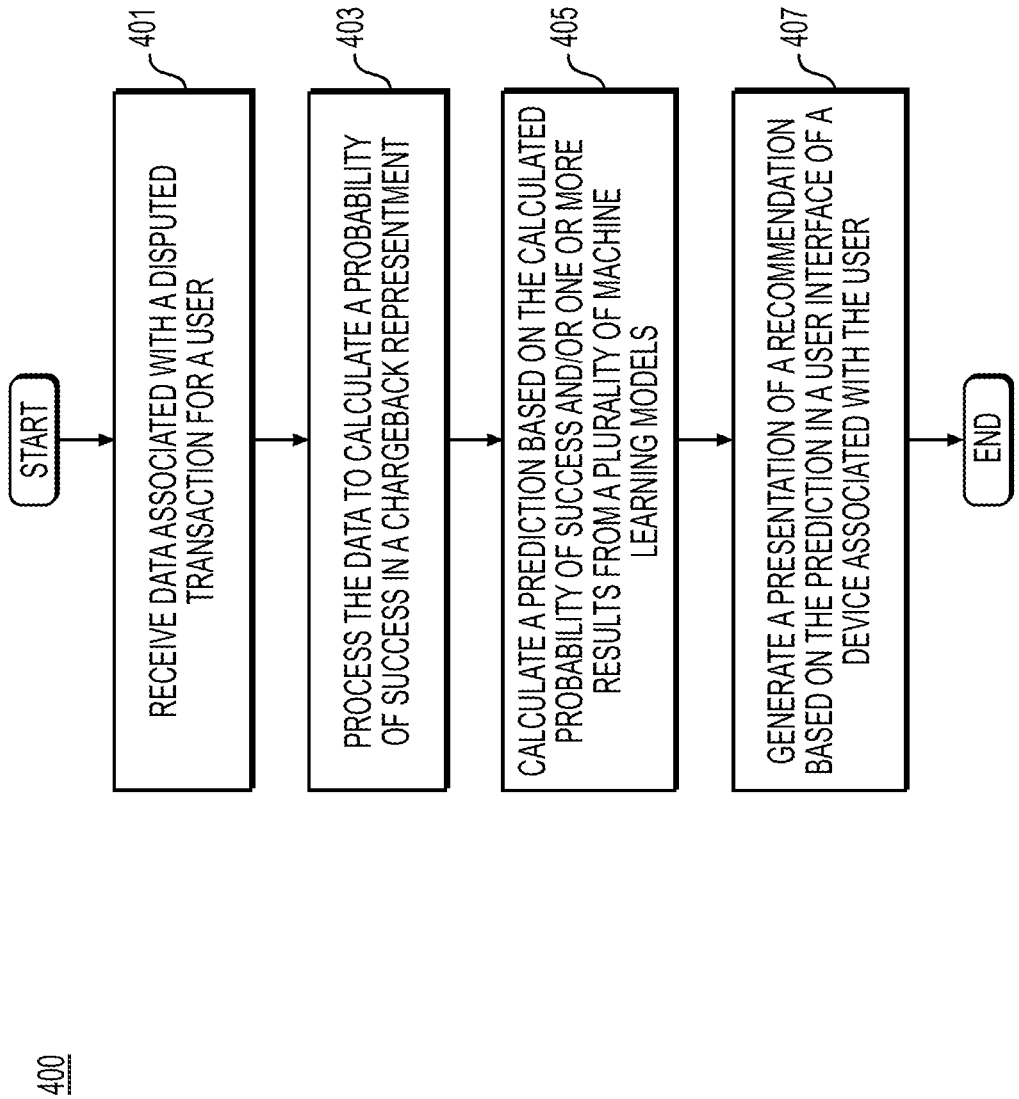
FIG. 4A is a flowchart of a process for generating a prediction of chargeback representment based on probability data and/or results from a plurality of machine learning models, according to one example embodiment.

FIG. 4A is a flowchart of a process for generating a prediction of chargeback representment based on probability data and/or results from a plurality of machine learning models, according to one example embodiment. In various embodiments, data analysis platform 109 and/or any of modules 201-211 may perform one or more portions of process 400 and may be implemented in, for instance, a chip set including a processor and a memory as shown in FIG. 10. As such, data analysis platform 109 and/or any of modules 201-211 may provide means for accomplishing various parts of process 400, as well as means for accomplishing embodiments of other processes described herein in conjunction with other components of system 100. Although process 400 is illustrated and described as a sequence of steps, it is contemplated that various embodiments of process 400 may be performed in any order or combination and need not include all of the illustrated steps.

In step 401, data analysis platform 109 may receive data associated with at least one disputed transaction for at least one user. In one embodiment, the received data includes user-specific information and/or merchant-specific information. In one example embodiment, user-specific information includes online activity information, historical user information, historical transaction information, historical chargeback information, or a combination thereof associated with at least one user. In another example embodiment, the merchant-specific information includes historical win rates for a merchant associated with at least one disputed transaction, global historical win rates for a group of merchants including the merchant associated with at least one disputed transaction, or a combination thereof.

In step 403, data analysis platform 109 may process the data to calculate a probability of success in a chargeback representment for at least one disputed transaction. In one embodiment, data analysis platform 109 may process historical data of one or more users to calculate a win probability and a loss probability for a chargeback representment. In one example embodiment, historical data may include fraud rates indicative of how often a cardholder maliciously disputed a valid transaction. Such cardholder-specific malicious chargeback based on the particular chargeback reason code may be stored in database 111 to indicate how frequently a cardholder initiates an illegitimate chargeback on a particular type of transaction. In another example embodiment, historical data may include global historical fraud rates indicative of how often a group of cardholders maliciously dispute valid transactions. For example, based on the particular chargeback reason code, corresponding global historical fraud rates can be stored in database 111 to indicate the frequency for a group of merchants to maliciously initiate chargebacks on valid transactions. In another example embodiment, historical data may include success rates indicative of how often a merchant successfully disputed a particular type of chargeback. Such merchant-specific historical win rate based on the particular chargeback reason code may be stored in database 111 to indicate how often the merchant successfully disputed a particular type of chargeback. In a further example embodiment, historical data may include global historical win rates indicative of how often a group of merchants successfully disputed a particular type of chargeback. For example, based on the particular chargeback reason code, a corresponding global historical win rate can be stored in database 111 to indicate how often merchants successfully disputed a particular type of chargeback.

In step 405, data analysis platform 109 may calculate a prediction based, at least in part, on the probability of success, one or more results from a plurality of machine learning models, or a combination thereof. In one embodiment, data analysis platform 109 may retrieve a plurality of chargeback data stored in database 111 to generate a chargeback prediction model. By analyzing historical chargebacks, data analysis platform 109 may determine whether a chargeback request is fraudulent. Data analysis platform 109 may use statistical methods, e.g., clustering and logistic regression, to analyze the plurality of chargeback data to identify particular data, e.g., indicators, that have historically contributed to identifying a chargeback request as fraudulent. In one embodiment, such indicators may be used to build the prediction model. According to various embodiments, data analysis platform 109 may use the chargeback prediction model to analyze the chargeback data associated with the new chargeback request to determine whether the new chargeback request is fraudulent. In one example embodiment, data analysis platform 109 may search the chargeback data associated with the new chargeback request for the indicators generated in the chargeback prediction model and, based on a statistical comparison, determines the likelihood for a chargeback to be fraudulent.

In step 407, data analysis platform 109 may generate a presentation of at least one recommendation on the chargeback representment based, at least in part, on the prediction in a user interface of UE 101 associated with at least one user, e.g., merchant. In one example embodiment, data analysis platform 109 may display a notification in the user interface of UE 101 recommending the user to either proceed with chargeback representment or to accept liability and not proceed with chargeback representment. The notification may be aural, visual, textual, or a combination thereof.

Figure 4B:
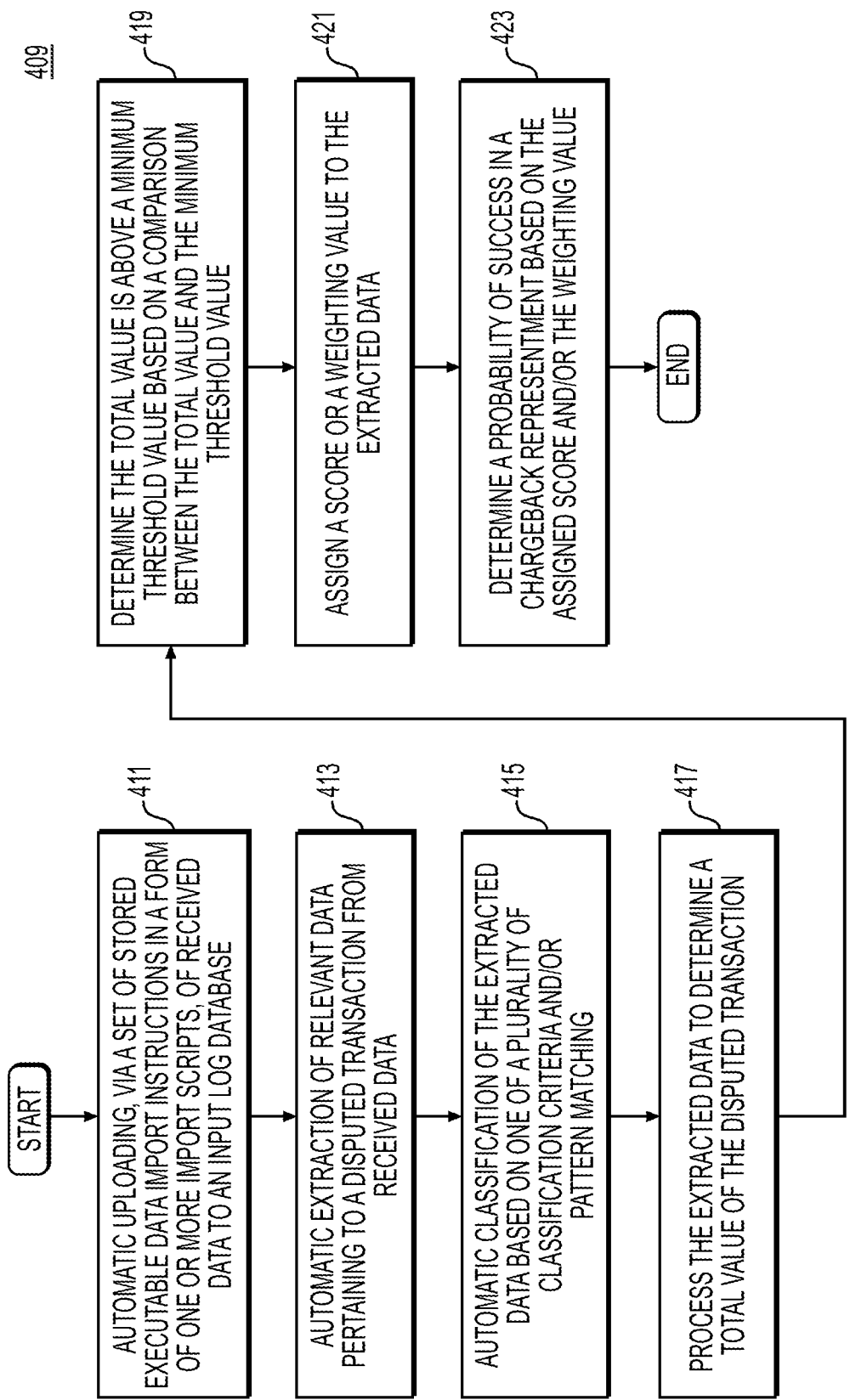
FIG. 4B is a flowchart of a process for calculating the probability of success in the chargeback representment, according to one example embodiment.

FIG. 4B is a flowchart of a process for calculating the probability of success in the chargeback representment, according to one example embodiment. In various embodiments, data analysis platform 109 and/or any of modules 201-211 may perform one or more portions of process 409 and may be implemented in, for instance, a chip set including a processor and a memory as shown in FIG. 10. As such, data analysis platform 109 and/or any of modules 201-211 may provide means for accomplishing various parts of process 409, as well as means for accomplishing embodiments of other processes described herein in conjunction with other components of system 100. Although process 409 is illustrated and described as a sequence of steps, it is contemplated that various embodiments of process 409 may be performed in any order or combination and need not include all of the illustrated steps.

In step 411, data analysis platform 109 may automatically upload, via a set of stored executable data import instructions in a form of one or more import scripts, the received data to an input log database. In one embodiment, the automatic uploading of the received data may activate a plurality of machine learning algorithms to process the data. In one embodiment, machine learning algorithms are configured to and trained for recognizing discrepancies in metadata of one or more disputed transactions.

In step 413, data analysis platform 109 may automatically extract relevant data pertaining to the disputed transaction from the received data. In one embodiment, data analysis platform 109 may separate contents that are to be analyzed from content that provides little or no insight on the disputed transaction. The data analysis platform 109 may perform one or more extractions based on the processing rules to extract data from the received data and contextualize the extracted data.

In step 415, data analysis platform 109 may automatically classify the extracted data based, at least in part, on one of a plurality of classification criteria, pattern matching, or a combination thereof. In one embodiment, classification criteria include content-based classification, context-based classification, user-based classification, or a combination thereof. In one example embodiment, the content-based classification includes analyzing the received data, comparing the analyzed data to the stored data, and then determining categories for the analyzed data based on the comparison. In another example embodiment, the context-based classification includes classifying data based, at least in part, on metadata, e.g., time the data was created, creator of the data, location the data was created, etc. In a further example embodiment, the user-based classification comprises classification based on preference information of one or more users.

In step 417, data analysis platform 109 may process the extracted data to determine the total value of the disputed transaction. In one embodiment, the total value of the disputed transaction is the sum of the transaction amount and the costs associated with disputing the chargeback. In another embodiment, data analysis platform 109 may incorporate risk factors while calculating the total value, e.g., risk of losing a customer if the chargeback is disputed, risk of losing the customer if the merchant loses the chargeback representment, etc.

In step 419, data analysis platform 109 may determine the total value is above a minimum threshold value based, at least in part, on a comparison between the total value and the minimum threshold value. In one embodiment, the minimum threshold value is equal to the transaction amount of the disputed transaction. In another embodiment, the minimum threshold value is adjusted based, at least in part, on user preference information, historical transaction information, market trends, or a combination thereof.

In step 421, data analysis platform 109 may assign a score or a weighting value to the extracted data. In one embodiment, data analysis platform 109 may assign a score or a weighting value to the transaction value, location of the transaction, time of the transaction, etc. In one embodiment, data analysis platform 109 may determine preset thresholds to calculate the probability, e.g., the score or the weighting value higher than or equal to 0.5 means the probability of the user winning the chargeback representment is high, whereas the score or the weighting value lower than 0.5 indicates that the user should accept the liability because the probability of the user winning the chargeback representment is low.

In step 423, data analysis platform 109 may determine the probability of success in the chargeback representment based, at least in part, on the assigned score, the weighting value, or a combination thereof.

Figure 4C:
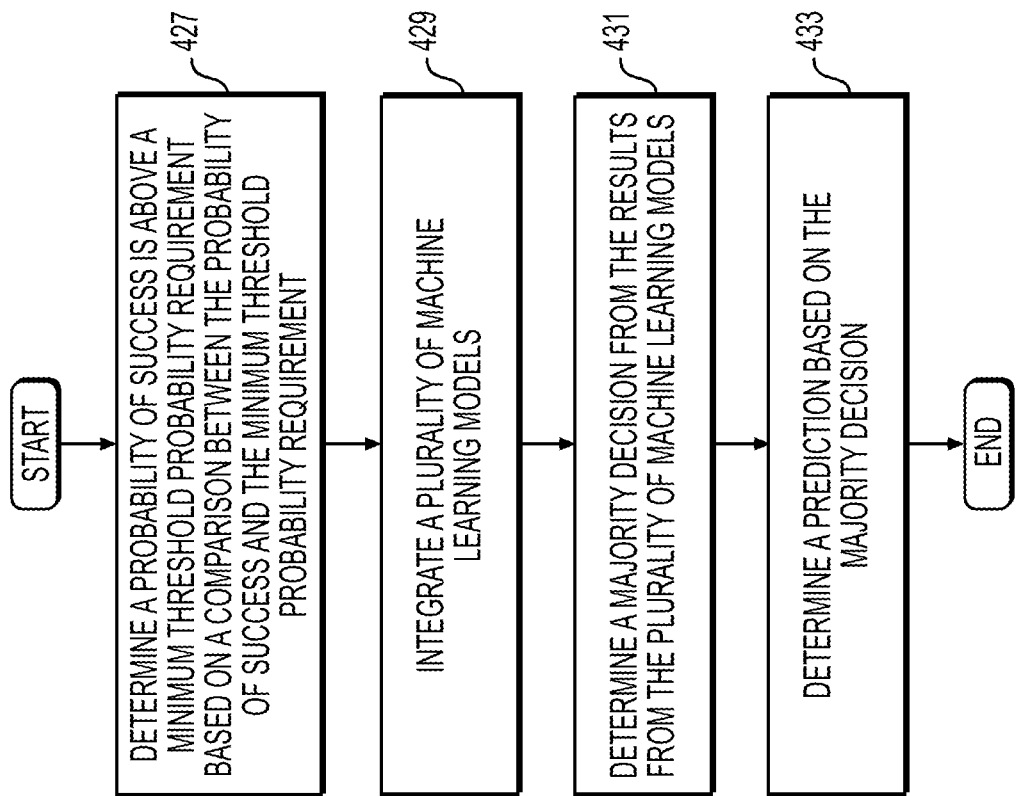
FIG. 4C is a flowchart of a process for determining a prediction for a chargeback representment, according to one example embodiment.

FIG. 4C is a flowchart of a process for determining a prediction for a chargeback representment, according to one example embodiment. In various embodiments, data analysis platform 109 and/or any of modules 201-211 may perform one or more portions of process 425 and may be implemented in, for instance, a chip set including a processor and a memory as shown in FIG. 10. As such, data analysis platform 109 and/or any of modules 201-211 may provide means for accomplishing various parts of process 425, as well as means for accomplishing embodiments of other processes described herein in conjunction with other components of system 100. Although process 425 is illustrated and described as a sequence of steps, it is contemplated that various embodiments of process 425 may be performed in any order or combination and need not include all of the illustrated steps.

In step 427, data analysis platform 109 may determine the probability of success is above a minimum threshold probability requirement based, at least in part, on a comparison between the probability of success and the minimum threshold probability requirement. In one embodiment, the minimum threshold probability requirement is based, at least in part, on historical transaction information, user preference information, or a combination thereof. In one embodiment, data analysis platform 109 may recommend accepting liability upon determining the probability of success is below the minimum threshold probability requirement.

In step 429, data analysis platform 109 may integrate the plurality of machine learning models. In one example embodiment, data analysis platform 109 may receive decisions on the probability of success from a plurality of machine learning models. In another example embodiment, data analysis platform 109 may implement a soft voting mechanism wherein the plurality of machine learning models do not have equal weightage. The machine learning model with a stronger inference may have a higher weightage and the machine learning model with a weaker inference may have a lower weightage. Data analysis platform 109 may calculate prediction based on the weightage of the machine learning models. Data analysis platform 109 may then integrate the machine learning models into a voting ensemble using the sklearn pipeline.

In step 431, data analysis platform 109 may determine a majority decision from one or more results from the plurality of machine learning models. In one example embodiment, three out of the five machine learning models predict that the merchant may win the chargeback representment whilst two machine learning models predict the merchant may lose. Data analysis platform 109 may then choose the majority predictions over the minority predictions. In another example embodiment, data analysis platform 109 may implement soft voting. The plurality of machine learning models does not have equal weightage. A machine learning model with a strong inference is assigned a high weightage whereas a machine learning model with a low inference is assigned a lower weightage.

In step 433, data analysis platform 109 may determine the prediction based, at least in part, on the majority decision. In another embodiment, data analysis platform 109 may calculate prediction based, at least in part, on the weightage of the machine learning models.

Figure 4D:
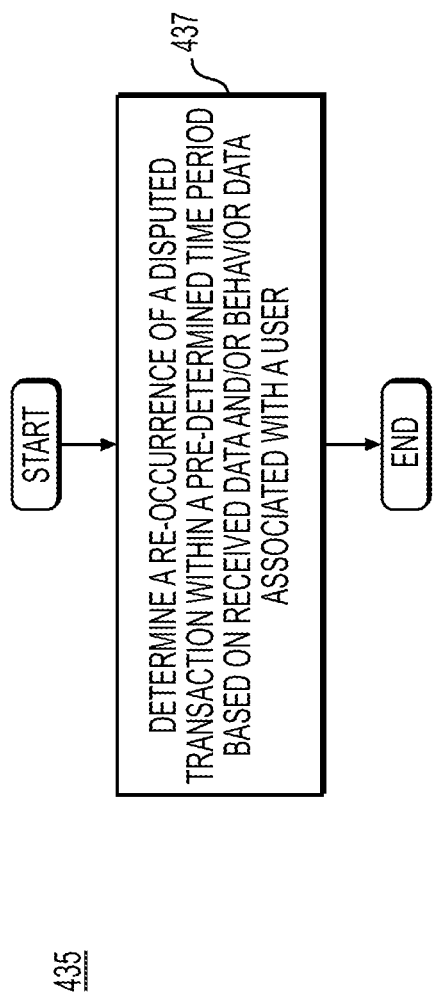
FIG. 4D is a flowchart of a process for determining a re-occurrence of a disputed transaction, according to one example embodiment.

FIG. 4D is a flowchart of a process for determining a re-occurrence of a disputed transaction, according to one example embodiment. In various embodiments, data analysis platform 109 and/or any of modules 201-211 may perform one or more portions of process 435 and may be implemented in, for instance, a chip set including a processor and a memory as shown in FIG. 10. As such, data analysis platform 109 and/or any of modules 201-211 may provide means for accomplishing various parts of process 435, as well as means for accomplishing embodiments of other processes described herein in conjunction with other components of system 100.

In step 437, data analysis platform 109 may determine a re-occurrence of at least one disputed transaction within a pre-determined time period based, at least in part, on the received data, behavior data, or a combination thereof associated with at least one user. In one embodiment, data analysis platform 109 may determine frequency information associated with a plurality of data transactions, and convert the frequency information into a frequency variable. In one example embodiment, data analysis platform 109 may dynamically track the amount of the transactions, the time at which the transactions occurred, the categories of the transactions, frequency of the transactions, most frequently visited ATMs, or the like for an individual account. Any deviation from such behaviors indicates a higher probability of fraud. Data analysis platform 109 may determine a re-occurrence of a disputed transaction in the future based on the frequency information. In some embodiments, the frequency variable may also be used with at least one other variable to predict fraudulent activity.

FIG. 5 is a flowchart of a process for automatically determining chargeback representments for disputed transactions, according to one example embodiment. In various embodiments, data analysis platform 109 and/or any of modules 201-211 may perform one or more portions of process 500 and may be implemented in, for instance, a chip set including a processor and a memory as shown in FIG. 10. As such, data analysis platform 109 and/or any of modules 201-211 may provide means for accomplishing various parts of process 500, as well as means for accomplishing embodiments of other processes described herein in conjunction with other components of system 100. Although process 500 is illustrated and described as a sequence of steps, it is contemplated that various embodiments of process 500 may be performed in any order or combination and need not include all of the illustrated steps.

In step 501, data analysis platform 109 may receive chargeback data for a disputed transaction. In one embodiment, chargeback data includes an acquiring bank identifier, an issuing bank identifier, an original transaction amount, a chargeback amount, a chargeback date, an acquiring bank reference number, a chargeback identifier, a chargeback reason code, a merchant name, a merchant country, a merchant state, merchant city, merchant location ID, transaction currency, card product type, merchant category code, e-commerce indicator, contactless payment indicator, recurring transaction indicator, account holder presence indicator, cross border indicator, whether a chargeback reached the presentment stage, the re-presentment stage, or the arbitration stage, and transaction date and time. In one embodiment, the chargeback data is received per schedule, in real-time, or periodically. The chargeback data is then uploaded into the input log storage, e.g., database 111.

In step 503, data analysis platform 109 may process the chargeback data via machine learning mechanisms. In one example embodiment, data analysis platform 109 may analyze the chargeback data based, at least in part on, historical chargeback data and economic feasibility data to determine whether to automatically initiate a chargeback representment, automatically queue or flag the chargeback for further review, or automatically accept financial liability for the chargeback. In one embodiment, data analysis platform 109 may calculate the win/loss probability and prediction for a chargeback representment.

In step 505, data analysis platform 109 may compare the total value of the disputed transaction to the minimum threshold value. In one embodiment, the minimum threshold value is calculated based, at least in part, on service fees, processing fees, and/or any other type of fee associated with disputing a chargeback. In decision block 505, data analysis platform 109 may recommend at least one merchant to accept financial liability upon determining the total value of the disputed transaction is less than the minimum threshold value (step 509). In contrast, data analysis platform 109 may proceed to step 507 upon determining the total value of the disputed transaction exceeds the minimum threshold value. In one embodiment, the minimum threshold value is dynamic, and changes in real-time with a change in fee associated with disputing a chargeback.

In step 507, data analysis platform 109 may compare the calculated win probability to the minimum threshold probability requirement. In one embodiment, the minimum threshold probability requirement is based, at least in part, on historical data on minimum thresholds for probability. The minimum threshold probability requirement is set at a higher level to avoid false positives. As the system matures and additional data is received, the minimum threshold probability requirement may be suitably fine-tuned per requirement. In another embodiment, the minimum threshold probability requirement is dynamic and may be calculated automatically by analyzing the pattern from the historical data. These values are adaptive in nature and change in real-time depending on the historical data. In decision block 507, data analysis platform 109 may recommend at least one merchant on chargeback representation upon determining the calculated win probability is higher than the minimum threshold probability requirement (step 511).

Figure 6:
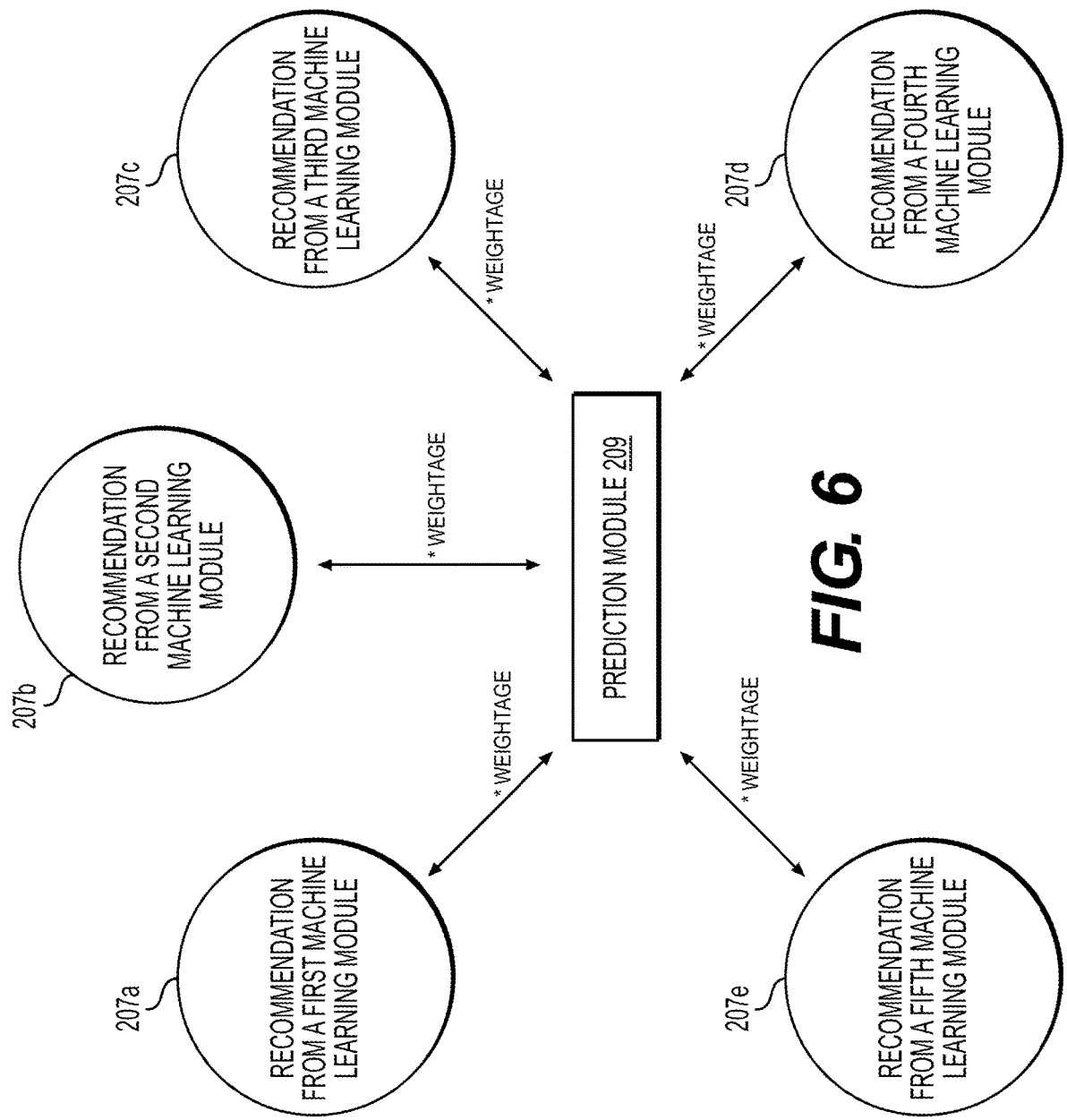
FIG. 6 is a diagram that represents a prediction module for chargeback representments, according to one example embodiment.

FIG. 6 is a diagram that represents a prediction module for chargeback representments, according to one example embodiment. In one example embodiment, prediction module 209 may implement five distinct machine learning modules, e.g., machine learning modules 207a-207e (collectively referred to as machine learning module 207), to predict chargeback representations. Prediction module 209 may integrate the five distinct machine learning modules into a voting ensemble using the sklearn pipeline. If three out of the five machine learning modules determine a high probability that the merchant may win the chargeback representment, the prediction module 209 may incorporate the majority decision in making a prediction. In another example embodiment, these five distinct machine learning modules may not have equal weightage, e.g., one machine learning model may be more powerful than the others. For example, machine learning model 207a may have a stronger inference and is assigned a higher weightage, and machine learning model 207c may have a lower inference and is assigned a lower weightage. Data analysis platform 109 may then calculate prediction based, at least in part, on the weightage of the machine learning models. In one embodiment, prediction module 209 may generate a batch prediction or a single prediction. In one embodiment, data analysis platform 109 may receive a plurality of data on a periodic or scheduled basis. The plurality of data may be categorized based on their similarity, and prediction module 209 may perform a batch prediction on a specific category of data. The plurality of data may also be categorized based on the users, e.g., customers, merchants, etc., and prediction module 209 may perform a single prediction for a specific user. For example, prediction module 209 may recommend a merchant to accept financial liability upon determining a win probability of 71% in a chargeback representment.

Figure 7:
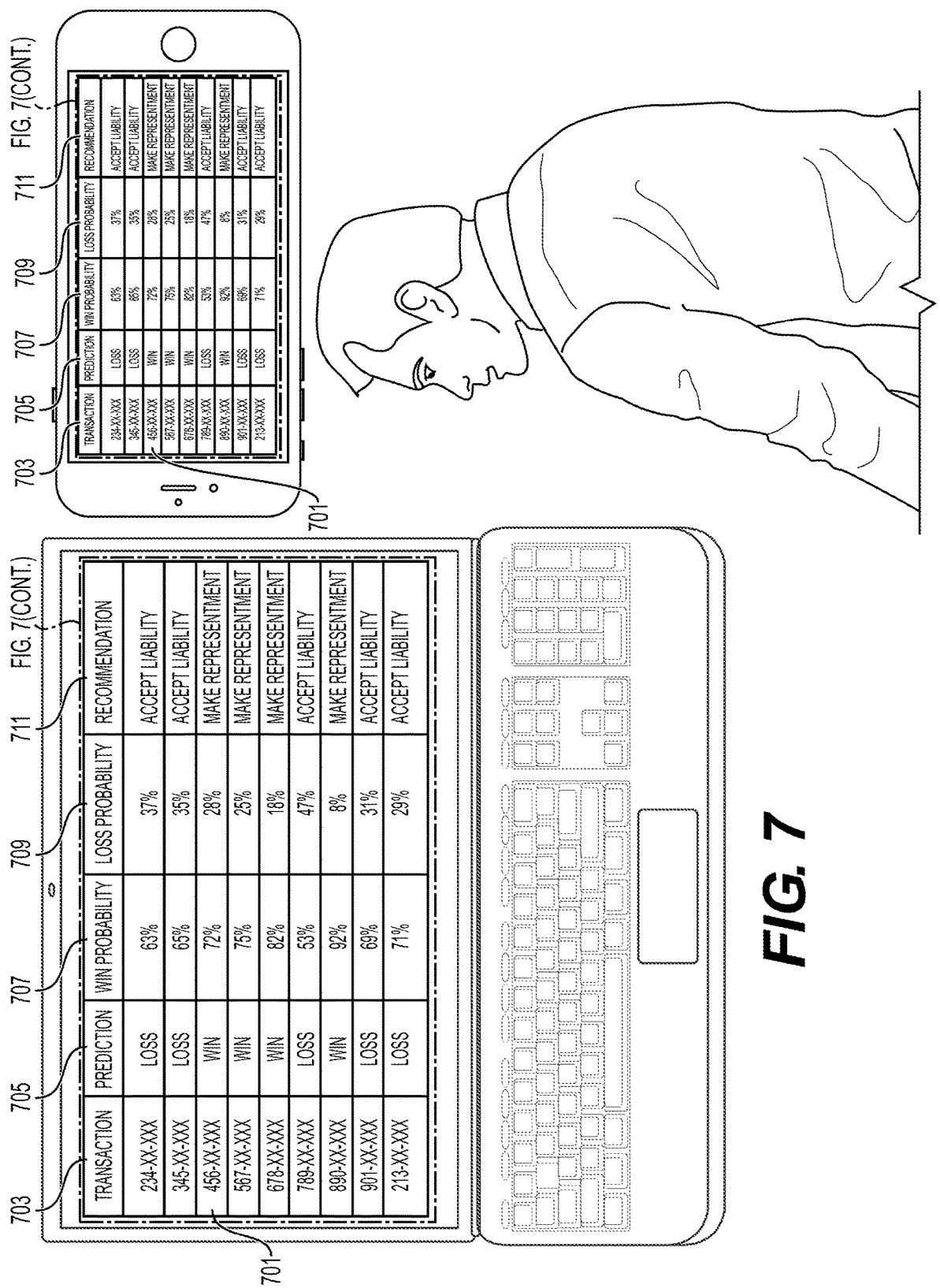
FIG. 7 is a schematic diagram illustrating a user interacting with an electronic device comprising a user interface that represents a presentation of prediction, probability, and recommendation on chargeback representment, according to one example embodiment.

FIG. 7 is a schematic diagram illustrating a user interacting with an electronic device comprising a user interface that represents a presentation of prediction, probability, and recommendation on chargeback representment, according to one example embodiment. In one embodiment, user interface 701 includes transaction 703, prediction 705, win probability 707, loss probability 709, and recommendation 711 for a disputed transaction. In one embodiment, transaction 703 includes transaction information, e.g., transaction number, data of transaction, transaction value, etc. The user can access additional information by hovering the cursor over transaction 703 or by clicking transaction 703. In one embodiment, prediction 705 represents the prediction results based on the calculation by prediction module 209. In one embodiment, win probability 707 and loss probability 709 are based on the calculation by machine learning module 207. For example, win probability 707 indicates the probability a merchant will win a chargeback representment and loss probability 709 indicates the probability a merchant will lose a chargeback representment. In one embodiment, recommendation 711 advises a user to either accept financial liability or proceed with chargeback representment. Such advice is based on the prediction data and the probability data. In one example embodiment, transaction that satisfies the minimum threshold value and the minimum threshold probability requirement are recommended for chargeback representment.

Figure 8:
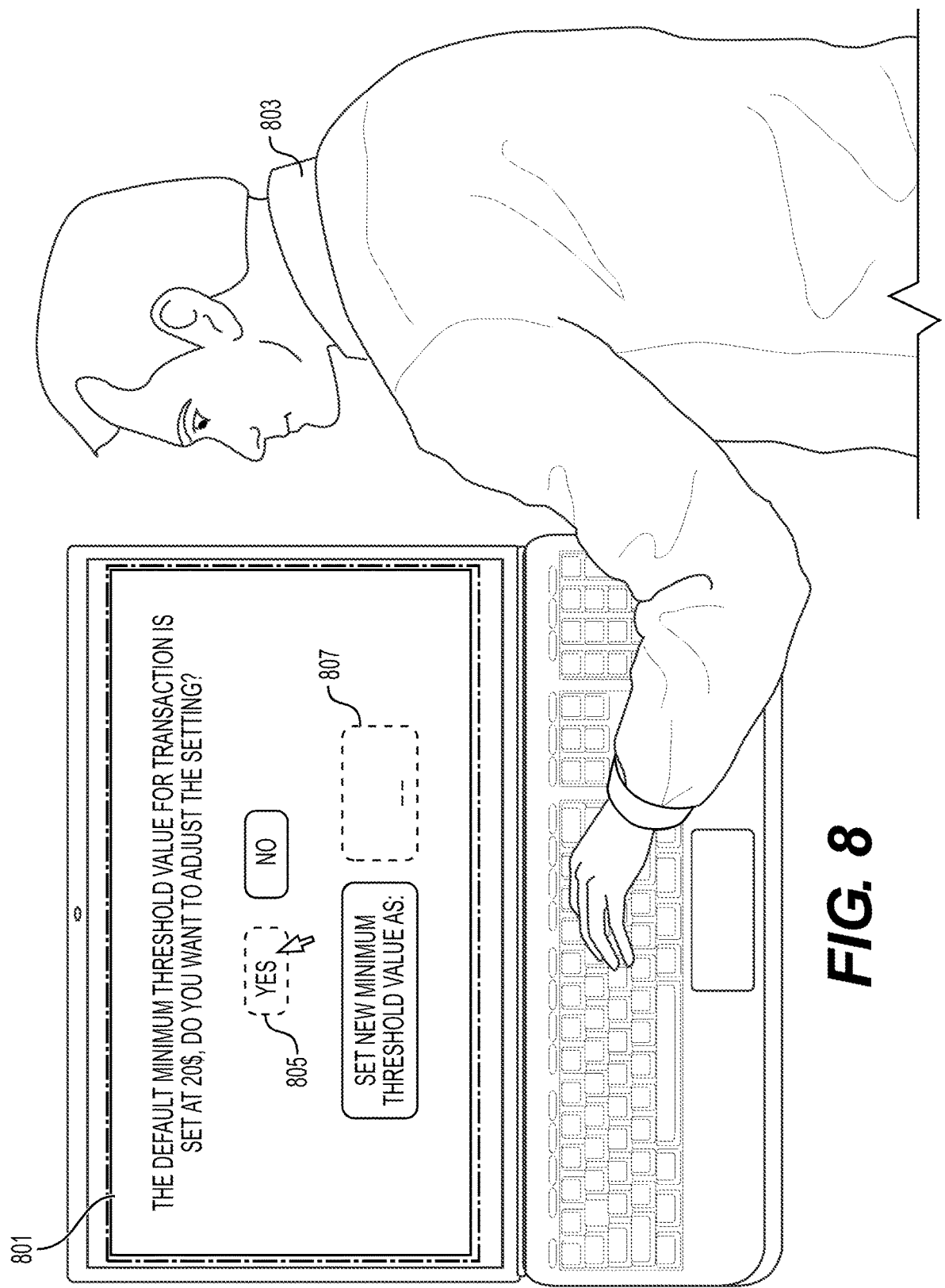
FIG. 8 represents a diagram wherein a user is manually configuring a minimum threshold value for filtering fraudulent transactions, according to one example embodiment.

FIG. 8 represents a diagram wherein a user is manually configuring a minimum threshold value for filtering fraudulent transactions, according to one example embodiment. In one embodiment, data analysis platform 109 may present user interface 801 to user 803 for manually adjusting a minimum threshold value. User 803 may select user interface element 805 to initiate the manual setting and then enter the minimum threshold value of their preference in data entry field 807. In one embodiment, the default minimum threshold value is the transaction amount of the disputed transaction. In another embodiment, the default minimum threshold value is based, at least in part, on historical data pertaining to threshold values. Data analysis platform 109 may process the newly entered value and may alert user 803 if the new threshold value is too low and may invite false positives. Data analysis platform 109 may also notify user 803 if the new threshold value is too high to yield any result and does not conform to historical data on threshold values.

Figure 9:
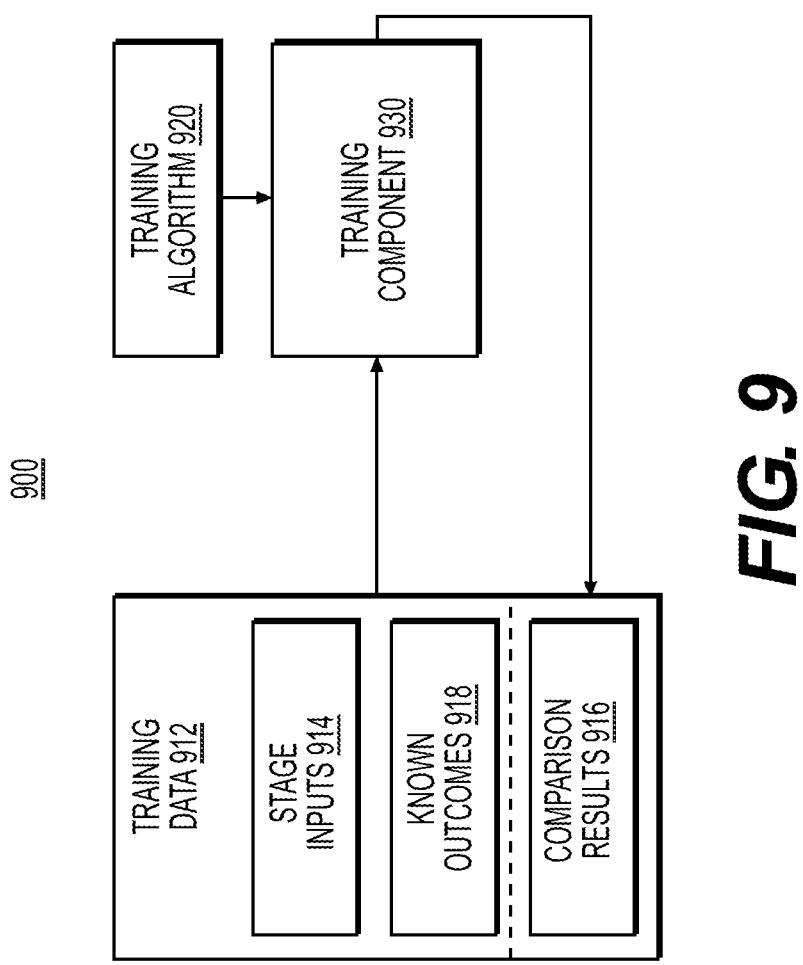
FIG. 9 shows an example machine learning training flow chart.

One or more implementations disclosed herein include and/or may be implemented using a machine learning model. For example, one or more of the win/loss probability and win/loss prediction may be implemented using a machine learning model and/or may be used to train a machine learning model. A given machine learning model may be trained using the data flow 900 of FIG. 9. Training data 912 may include one or more of stage inputs 914 and known outcomes 918 related to a machine learning model to be trained. The stage inputs 914 may be from any applicable source including text, visual representations, data, values, comparisons, stage outputs (e.g., one or more outputs from a step from FIGS. 4 and/or 5). The known outcomes 918 may be included for machine learning models generated based on supervised or semi-supervised training. An unsupervised machine learning model may not be trained using known outcomes 918. Known outcomes 918 may include known or desired outputs for future inputs similar to or in the same category as stage inputs 914 that do not have corresponding known outputs.

The training data 912 and a training algorithm 920 (e.g., one or more of the win/loss probability and win/loss prediction implemented using a machine learning model and/or may be used to train a machine learning model) may be provided to a training component 930 that may apply the training data 912 to the training algorithm 920 to generate a machine learning model. According to an implementation, the training component 930 may be provided comparison results 916 that compare a previous output of the corresponding machine learning model to apply the previous result to re-train the machine learning model. The comparison results 916 may be used by the training component 930 to update the corresponding machine learning model. The training algorithm 920 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like.

A machine learning model used herein may be trained and/or used by adjusting one or more weights and/or one or more layers of the machine learning model. For example, during training, a given weight may be adjusted (e.g., increased, decreased, removed) based on training data or input data. Similarly, a layer may be updated, added, or removed based on training data/and or input data. The resulting outputs may be adjusted based on the adjusted weights and/or layers.

In general, any process or operation discussed in this disclosure that is understood to be computer-implementable, such as the process illustrated in FIGS. 4 and/or 5 may be performed by one or more processors of a computer system as described herein. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices. One or more processors of a computer system may be included in a single computing device or distributed among a plurality of computing devices. One or more processors of a computer system may be connected to a data storage device. A memory of the computer system may include the respective memory of each computing device of the plurality of computing devices.

In various embodiments, one or more portions of process 400 and 500 may be implemented in, for instance, a chip set including a processor and a memory as shown in FIG. 10. FIG. 10 illustrates an implementation of a general computer system that may execute techniques presented herein. The computer system 1000 can include a set of instructions that can be executed to cause the computer system 1000 to perform any one or more of the methods, system, or computer based functions disclosed herein. The computer system 1000 may operate as a standalone device or may be connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

In a networked deployment, the computer system 1000 may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a control system, a camera, a scanner, a facsimile machine, a personal trusted device, a web appliance, a network router, switch or bridge, or any other machine capable of executing a set of instructions (sequential or otherwise) that specify actions to be taken by that machine. In a particular implementation, the computer system 1000 can be implemented using electronic devices that provide voice, video, or data communication. Further, while a computer system 1000 is illustrated as a single system, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. The processor 1002 may be a component in a variety of systems. For example, the processor 1002 may be part of a standard personal computer or a workstation. The processor 1002 may be one or more general processors, digital signal processors, application specific integrated circuits, field programmable gate arrays, servers, networks, digital circuits, analog circuits, combinations thereof, or other now known or later developed devices for analyzing and processing data. The processor 1002 may implement a software program, such as code generated manually (i.e., programmed).

The computer system 1000 may include a memory 1004 that can communicate via a bus 1008. The memory 1004 may be a main memory, a static memory, or a dynamic memory. The memory 1004 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 1004 includes a cache or random-access memory for the processor 1002. In alternative implementations, the memory 1004 is separate from the processor 1002, such as a cache memory of a processor, the system memory, or other memory. The memory 1004 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1004 is operable to store instructions executable by the processor 1002. The functions, acts or tasks illustrated in the figures or described herein may be performed by the processor 1002 executing the instructions stored in the memory 1004. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 1000 may further include a display 1010, such as a liquid crystal display (LCD), an organic light emitting diode (OLED), a flat panel display, a solid-state display, a cathode ray tube (CRT), a projector, a printer or other now known or later developed display device for outputting determined information. The display 1010 may act as an interface for the user to see the functioning of the processor 1002, or specifically as an interface with the software stored in the memory 1004 or in the drive unit 1006.

Additionally or alternatively, the computer system 1000 may include an input/output device 1012 configured to allow a user to interact with any of the components of computer system 1000. The input/output device 1012 may be a number pad, a keyboard, or a cursor control device, such as a mouse, or a joystick, touch screen display, remote control, or any other device operative to interact with the computer system 1000.

The computer system 1000 may also or alternatively include drive unit 1006 implemented as a disk or optical drive. The drive unit 1006 may include a computer-readable medium 1022 in which one or more sets of instructions 1024, e.g. software, can be embedded. Further, instructions 1024 may embody one or more of the methods or logic as described herein. The instructions 1024 may reside completely or partially within the memory 1004 and/or within the processor 1002 during execution by the computer system 1000. The memory 1004 and the processor 1002 also may include computer-readable media as discussed above.

In some systems, a computer-readable medium 1022 includes instructions 1024 or receives and executes instructions 1024 responsive to a propagated signal so that a device connected to a network 1070 can communicate voice, video, audio, images, or any other data over the network 1070. Further, the instructions 1024 may be transmitted or received over the network 1070 via a communication port or interface 1020, and/or using a bus 1008. The communication port or interface 1020 may be a part of the processor 1002 or may be a separate component. The communication port or interface 1020 may be created in software or may be a physical connection in hardware. The communication port or interface 1020 may be configured to connect with a network 1070, external media, the display 1010, or any other components in computer system 1000, or combinations thereof. The connection with the network 1070 may be a physical connection, such as a wired Ethernet connection or may be established wirelessly as discussed below. Likewise, the additional connections with other components of the computer system 1000 may be physical connections or may be established wirelessly. The network 1070 may alternatively be directly connected to a bus 1008.

While the computer-readable medium 1022 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 1022 may be non-transitory, and may be tangible.

The computer-readable medium 1022 can include a solid-state memory such as a memory card or other package that houses one or more non-volatile read-only memories. The computer-readable medium 1022 can be a random-access memory or other volatile re-writable memory. Additionally or alternatively, the computer-readable medium 1022 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 1000 may be connected to a network 1070. The network 1070 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 1070 may include wide area networks (WAN), such as the Internet, local area networks (LAN), campus area networks, metropolitan area networks, a direct connection such as through a Universal Serial Bus (USB) port, or any other networks that may allow for data communication. The network 1070 may be configured to couple one computing device to another computing device to enable communication of data between the devices. The network 1070 may generally be enabled to employ any form of machine-readable media for communicating information from one device to another. The network 1070 may include communication methods by which information may travel between computing devices. The network 1070 may be divided into sub-networks. The sub-networks may allow access to all of the other components connected thereto or the sub-networks may restrict access between the components. The network 1070 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for reducing false positives and recommending chargeback representment, comprising:
   receiving, by one or more processors, data associated with at least one disputed transaction for at least one user, wherein the received data includes user-specific information, merchant-specific information, or a combination thereof;
   uploading, by the one or more processors via a set of stored executable data, import instructions in a form of one or more import scripts, the received data to an input log database;
   inputting, by the one or more processors, the received data uploaded to the input log database in a plurality of machine learning models configured to calculate a corresponding probability of success in a chargeback representment for the at least one disputed transaction, wherein each of the plurality of machine learning models is assigned a weight based on a training and re-training process to reduce false positives;
   in response to the inputting, receiving, by the one or more processors, a plurality of probabilities corresponding to the plurality of machine learning models;
   determining, by the one or more processors, a majority decision from the plurality of probabilities from the plurality of machine learning models;
   determining, by the one or more processors, a prediction based, at least in part, on the majority decision;
   generating, by the one or more processors, a presentation of at least one recommendation on the chargeback representment based, at least in part, on the prediction in a user interface of at least one device associated with the at least one user;
   re-training, by the one or more processors, at least one of the plurality of machine learning models based on the recommendation on the chargeback representment and the corresponding probability of success in a chargeback representment for the at least one disputed transaction; and
   assigning, by the one or more processors, an updated assigned weight for each of the plurality of machine learning models based on the re-training of at least one of the plurality of machine learning models, wherein the updated assigned weight reduces false positives.

2. The method of claim 1, wherein uploading of the received data activates a plurality of machine learning algorithms to process the data.

3. The method of claim 2, further comprising:
   automatically extract relevant data pertaining to the disputed transaction from the received data; and
   automatically classify the extracted data based, at least in part, on one of a plurality of classification criteria, pattern matching, or a combination thereof.

4. The method of claim 3, wherein calculating the probability of success in the chargeback representment, further comprising:

processing the extracted data to determine a total value of the disputed transaction; and determining the total value is above a minimum threshold value based, at least in part, on a comparison between the total value and the minimum threshold value.

5. The method of claim 4, further comprising:
assigning a score or a weighting value to the extracted data; and determining the probability of success in the chargeback representment based, at least in part, on the assigned score, the weighting value, or a combination thereof.

6. The method of claim 4, wherein calculating the prediction, further comprising:
determining the probability of success is above a minimum threshold probability requirement based, at least in part, on a comparison between the probability of success and the minimum threshold probability requirement.

7. The method of claim 3, wherein the classification criteria comprises content-based classification and/or user-based classification.

8. The method of claim 1, further comprising:
determining a re-occurrence of the at least one disputed transaction within a pre-determined time period based, at least in part, on the received data, behavior data, or a combination thereof associated with the at least one user.

9. The method of claim 1, wherein the user-specific information includes online activity information, historical user information, historical transaction information, historical chargeback information, or a combination thereof associated with the at least one user.

10. The method of claim 1, wherein the merchant-specific information includes historical win rates for a merchant associated with the at least one disputed transaction, global historical win rates for a group of merchants including the merchant associated with the at least one disputed transaction, or a combination thereof.

11. An apparatus for reducing false positives and recommending chargeback representment, comprising:
at least one processor; and
at least one memory including computer program code for one or more programs, the at least one memory and the computer program code configured to, with the at least one processor, cause the apparatus to perform operations comprising:
receive, by one or more processors, data associated with at least one disputed transaction for at least one user, wherein the received data includes user-specific information, merchant-specific information, or a combination thereof;
upload, by the one or more processors via a set of stored executable data, import instructions in a form of one or more import scripts, the received data to an input log database;
input, by the one or more processors, the received data uploaded to the input log database in a plurality of machine learning models configured to calculate a corresponding probability of success in a chargeback representment for the at least one disputed transaction, wherein each of the plurality of machine learning models is assigned a weight based on a training and re-training process to reduce false positives;
in response to the inputting, receive, by the one or more processors, a plurality of probabilities corresponding to the plurality of machine learning models;

determine, by the one or more processors, a majority decision from the plurality of probabilities from the plurality of machine learning models;
determine, by the one or more processors, a prediction based, at least in part, on the majority decision;
generate, by the one or more processors, a presentation of at least one recommendation on the chargeback representment based, at least in part, on the prediction in a user interface of at least one device associated with the at least one user;
re-train, by the one or more processors, at least one of the plurality of machine learning models based on the recommendation on the chargeback representment and the corresponding probability of success in a chargeback representment for the at least one disputed transaction; and
assign, by the one or more processors, an updated assigned weight for each of the plurality of machine learning models based on the re-training of at least one of the plurality of machine learning models, wherein the updated assigned weight reduces false positives.

12. The apparatus of claim 11, wherein receiving the data associated with the at least one disputed transaction, further comprising:
automatic uploading, via a set of stored executable data import instructions in a form of one or more import scripts, of the received data to an input log database, wherein the automatic uploading of the received data activates a plurality of machine learning algorithms to process the data.

13. The apparatus of claim 12, further comprising:
automatic extraction of relevant data pertaining to the disputed transaction from the received data; and
automatic classification of the extracted data based, at least in part, on one of a plurality of classification criteria, pattern matching, or a combination thereof.

14. The apparatus of claim 13, wherein calculating the probability of success in the chargeback representment, further comprising:
process the extracted data to determine a total value of the disputed transaction; and
determine the total value is above a minimum threshold value based, at least in part, on a comparison between the total value and the minimum threshold value.

15. The apparatus of claim 14, further comprising:
assign a score or a weighting value to the extracted data; and
determine the probability of success in the chargeback representment based, at least in part, on the assigned score, the weighting value, or a combination thereof.

16. The apparatus of claim 14, wherein calculating the prediction, further comprising:
determine the probability of success is above a minimum threshold probability requirement based, at least in part, on a comparison between the probability of success and the minimum threshold probability requirement.

17. The apparatus of claim 16, further comprising:
integrate the plurality of machine learning models;
determine a majority decision from the one or more results from the plurality of machine learning models; and
determine the prediction based, at least in part, on the majority decision.

18. A non-transitory computer-readable storage medium carrying one or more sequences of one or more instructions for reducing false positives and recommending chargeback representment, when executed by one or more processors, cause an apparatus to at least perform the following steps:

receiving, by one or more processors, data associated with at least one disputed transaction for at least one user, wherein the received data includes user-specific information, merchant-specific information, or a combination thereof;

uploading, by the one or more processors via a set of stored executable data, import instructions in a form of one or more import scripts, the received data to an input log database;

inputting, by the one or more processors, the received data uploaded to the input log database in a plurality of machine learning models configured to calculate a corresponding probability of success in a chargeback representment for the at least one disputed transaction, wherein each of the plurality of machine learning models is assigned a weight based on a training and re-training process to reduce false positives;

in response to the inputting, receiving, by the one or more processors, a plurality of probabilities corresponding to the plurality of machine learning models;

determining, by the one or more processors, a majority decision from the plurality of probabilities from the plurality of machine learning models;

determining, by the one or more processors, a prediction based, at least in part, on the majority decision;

generating, by the one or more processors, a presentation of at least one recommendation on the chargeback representment based, at least in part, on the prediction in a user interface of at least one device associated with the at least one user;

re-training, by the one or more processors, at least one of the plurality of machine learning models based on the recommendation on the chargeback representment and the corresponding probability of success in a chargeback representment for the at least one disputed transaction; and assigning, by the one or more processors, an updated assigned weight for each of the plurality of machine learning models based on the re-training of at least one of the plurality of machine learning models, wherein the updated assigned weight reduces false positives.

19. The non-transitory computer-readable storage medium of claim 18, wherein receiving the data associated with the at least one disputed transaction, further comprising:

automatically uploading, via a set of stored executable data import instructions in a form of one or more import scripts, the received data to an input log database, wherein the automatic uploading of the received data activates a plurality of machine learning algorithms to process the data.

20. The non-transitory computer-readable storage medium of claim 18, further comprising:

automatically extract relevant data pertaining to the disputed transaction from the received data;

automatically classify the extracted data based, at least in part, on one of a plurality of classification criteria, pattern matching, or a combination thereof.

* * * * *

UNITED STATES PATENT AND TRADEMARK OFFICE
CERTIFICATE OF CORRECTION

| | | |
|---|---|---|
| PATENT NO. | : 12,314,960 B2 | Page 1 of 1 |
| APPLICATION NO. | : 17/834677 | |
| DATED | : May 27, 2025 | |
| INVENTOR(S) | : Rajiv Ramanjani et al. | |

It is certified that error appears in the above-identified patent and that said Letters Patent is hereby corrected as shown below:

On the Title Page

Column 1 (Below Prior Publication Data), Line 1, below "US 2023/0281635 A1 Sep. 7, 2023" insert --(30) Foreign Application priority Data Mar. 3, 2022 (IN) 202211011590--.

Signed and Sealed this
Eighth Day of July, 2025

Coke Morgan Stewart
*Acting Director of the United States Patent and Trademark Office*